United States Patent
Futami et al.

(10) Patent No.: US 7,643,754 B2
(45) Date of Patent: Jan. 5, 2010

(54) METHOD OF AND APPARATUS FOR PROVIDING MULTI-WAVELENGTH LIGHT SOURCE

(75) Inventors: Fumio Futami, Kawasaki (JP); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 551 days.

(21) Appl. No.: 10/762,551

(22) Filed: Jan. 23, 2004

(65) Prior Publication Data
US 2004/0179842 A1 Sep. 16, 2004

(30) Foreign Application Priority Data
Mar. 13, 2003 (JP) ............................ 2003-068631

(51) Int. Cl.
*H04J 14/02* (2006.01)
(52) U.S. Cl. ......................... 398/75; 398/90; 398/102
(58) Field of Classification Search ................ 398/75, 398/90, 102
See application file for complete search history.

(56) References Cited

U.S. PATENT DOCUMENTS

| | | | |
|---|---|---|---|
| 3,430,048 A * | 2/1969 | Rubinstein | 359/317 |
| 5,703,708 A * | 12/1997 | Das et al. | 398/102 |
| 6,081,355 A | 6/2000 | Sharma et al. | |
| 6,577,782 B1 * | 6/2003 | Leaird et al. | 385/15 |
| 6,901,174 B2 * | 5/2005 | Gupta | 385/1 |
| 7,142,789 B1 * | 11/2006 | Weiner et al. | 398/201 |
| 2002/0003641 A1 * | 1/2002 | Hall et al. | 359/122 |
| 2003/0043451 A1 * | 3/2003 | Kato et al. | 359/326 |

FOREIGN PATENT DOCUMENTS

| | | |
|---|---|---|
| EP | 0 837 575 | 4/1998 |
| EP | 0 905 937 | 3/1999 |
| EP | 1185007 A2 * | 3/2002 |
| JP | 64-67043 | 3/1989 |
| JP | 6-331329 | 12/1994 |
| JP | 08-195732 | 7/1996 |
| JP | 9-244076 | 9/1997 |
| JP | 10-307079 | 11/1998 |
| JP | 2002-077052 | 3/2002 |
| JP | 2002-250946 | 9/2002 |

OTHER PUBLICATIONS

Morioka, T. et al. "Multiwavelength picosecond pulse source with low jitter and high optical frequency stability based on 200 nm supercontinuum filtering." Electronics Letters, vol. 31, No. 13, Jun. 22, 1995: 1064-1066.*

Yamada et al., "A High SNR, 150 ch Supercontinuum CW Optical Source with Precise 25 GHz Spacing for 10 Gbit/s DWDM Systems," Optical Fiber Communication Conference (OFC). Technical Digest Post-Conference Edition, Mar. 17-22, 2001, pp. ME21-ME23.

European Search Report and Annex dated Mar. 28, 2006 of Application No. EP 04 00 1448.

Japanese Office Action issued on Oct. 24, 2008 in corresponding Japanese Patent Application No. 2003-068631.

Japanese Office Action issued on May 12, 2009 in corresponding Japanese Patent Application 2003-068631.

* cited by examiner

*Primary Examiner*—Leslie Pascal
(74) *Attorney, Agent, or Firm*—Staas & Halsey LLP

(57) ABSTRACT

A method of providing a multi-wavelength light source includes the steps of modulating an optical pulse source so as to output optical pulses with a designated repetition frequency, time-division multiplexing the optical pulses output by the optical pulse source so as to output optical pulses with a repetition frequency which is an integral multiple of the designated repetition frequency, and demultiplexing wavelengths of the optical pulses with the repetition frequency which is the integral multiple of the designated repetition frequency so as to output the wavelengths as the multi-wavelength light source.

5 Claims, 5 Drawing Sheets

METHOD OF AND APPARATUS FOR PROVIDING MULTI-WAVELENGTH LIGHT SOURCE

BACKGROUND OF THE INVENTION

1. Field of the Invention

The present invention generally relates to a method of and an apparatus for providing a multi-wavelength light source, and particularly relates to a method of and an apparatus for providing a multi-wavelength light source in which a light source comprising a number of wavelengths arranged at equal frequency spacings is produced.

2. Description of the Related Art

Ever since a Wavelength Division Multiplexing (WDM) system has been put to practical use, a trend towards a larger transmission capacity has been continuing.

Presentations on a system using hundreds of monochromatic light sources which would exceed 1 Terabit/sec in total capacity at a transmission bit rate of between 10 and 40 Gigabits/sec per wavelength are being actively carried out.

According to the specifications by the ITU-T recommendations, wavelengths of an optical signal in an optical communications system are to be arranged at 50 or 100 GHz spacings based on 193.1 THz. Therefore, the wavelengths must be controlled precisely so as to oscillate within the grid as specified therein.

As illustrated in FIG. 1, a multi-wavelength light source which has been used most generally up to now, includes monochromatic lasers 10-1 through 10-n. Herein, n is an integer. The respective monochromatic lasers may, for example, be distributed feedback lasers, etc. Such composition necessitates providing hundreds of lasers in a large-capacity communications system using hundreds of wavelengths so as to make an increase in the size of the multi-wavelength light source apparatus and an increase in the amount of electric power consumption inevitable. Also, in order to manage the absolute wavelengths, one of the monitoring and control circuits 12-1 through 12-n which monitor the output wavelengths so as to compensate for an offset from the grid must be arranged per laser.

As illustrated in FIG. 2, as another method of implementing a multi-wavelength light source in a simple composition, there is a method of implementing a multi-wavelength light source by demultiplexing at the wavelength demultiplexer 16 a longitudinal component produced by the modulation from a modulated light output at the optical pulse source 14 which is modulated at a repetition frequency of $f_0$ (refer to the Non-Patent Document 1, for example).

The electric field $E_0$ of a lightwave pulse train with a repetition frequency of $f_0$ (Hz) is represented by the equation (1). Herein, t is the time, g( ) is a function, and n is an integer.

$$E_0(t) = \sum_n g(t + n * 1/f_0) \quad (1)$$

The optical spectrum $P_0$ may be obtained by a Fourier transform and is shown by the equation (2).

$$P_0(f) = (2\pi/T_0^2)|\hat{g}(2\pi f)|^2 \sum_n \delta(f - nf_0), \quad (2)$$

where $\hat{g}(\ )$ is a Fourier transform of g( ).

As it may be understood from the mathematical equation (2), the wavelength domain includes longitudinal components of $f_0$ (Hz). Extracting these longitudinal components with a narrowband filter enables the producing of a number of monochromatic light sources, the number corresponding to only the number of longitudinal components.

This method includes an aspect to enable the implementation of a plurality of monochromatic light sources from a (pumping) light source so as to allow a simple implementation of a light source composition. Also, as the spacings between the longitudinal components correspond to the modulating frequency, managing the modulating frequency with high precision enables the leaving out of the monitoring and control of individual wavelengths.

Besides, as a technology to demultiplex a number of wavelengths all together, there is, for example, one which is described in the Patent Document 1.

Non-Patent Document 1
Optical fiber communication 2001, ME-2, Anaheim, Calif., March 17-22.
Patent Document 1
JP8-195732A
Patent Document 2
JP2002-77052A As described above, although it is possible to extract longitudinal components of an optical spectrum with a narrowband filter, as the longitudinal components are produced by electrical modulation in the related art as illustrated in FIG. 2, their spacings are limited by the electronic operating speed. Thus there exists a problem in that producing a longitudinal component which exceeds 40 GHz, a frequency generally known as the limit of electronic operations, is difficult.

SUMMARY OF THE INVENTION

It is a general object of the present invention to provide a method of and an apparatus for providing a multi-wavelength light source that substantially obviate one or more problems caused by the limitations and disadvantages of the related art.

In view of the above points, it is a more particular object of the present invention to provide a method of and an apparatus for providing a multi-wavelength light source having a simple configuration which enables the obtaining of a plurality of monochromatic light sources and to provide a multi-wavelength light source with equal frequency spacings between the wavelengths, said frequency spacing exceeding the frequency limit of electronic modulation.

According to the invention, a method of providing a multi-wavelength light source includes the steps of modulating an optical pulse source so as to output optical pulses with a designated repetition frequency, time-division multiplexing the optical pulses output by said optical pulse source so as to output optical pulses with a repetition frequency which is an integral multiple of said designated repetition frequency, and demultiplexing wavelengths of the optical pulses with the repetition frequency which is the integral multiple of said designated repetition frequency so as to output said wavelengths as the multi-wavelength light source.

The method of providing a multi-wavelength light source as described above enables the obtaining of a plurality of monochromatic light sources and the providing of a multi-wavelength light source with equal frequency spacings between the wavelengths, said frequency spacing exceeding the frequency limit of electronic modulation.

According to another aspect of the invention, an apparatus for providing a multi-wavelength light source includes an optical pulse source which is modulated so as to output optical pulses with a designated repetition frequency, a time-division multiplexing unit which time-division multiplexes the optical pulses output by said optical pulse source so as to output optical pulses with a repetition frequency which is an integral multiple of said designated repetition frequency, and a wavelength demultiplexing unit which demultiplexes wavelengths of the optical pulses with the repetition frequency which is the integral multiple of said designated repetition frequency so as to output said wavelengths as the multi-wavelength light source.

The apparatus for providing a multi-wavelength light source as described above enables the obtaining of a plurality of monochromatic light sources and the providing of a multi-wavelength light source with equal frequency spacings between the wavelengths, said frequency spacing exceeding the frequency limit of electronic modulation.

Other objects and further features of the present invention will be apparent from the following detailed description when read in conjunction with the accompanying drawings.

DETAILED DESCRIPTION OF THE PREFERRED EMBODIMENTS

In the following, embodiments of the present invention are described with reference to the accompanying drawings.

Figure 1:
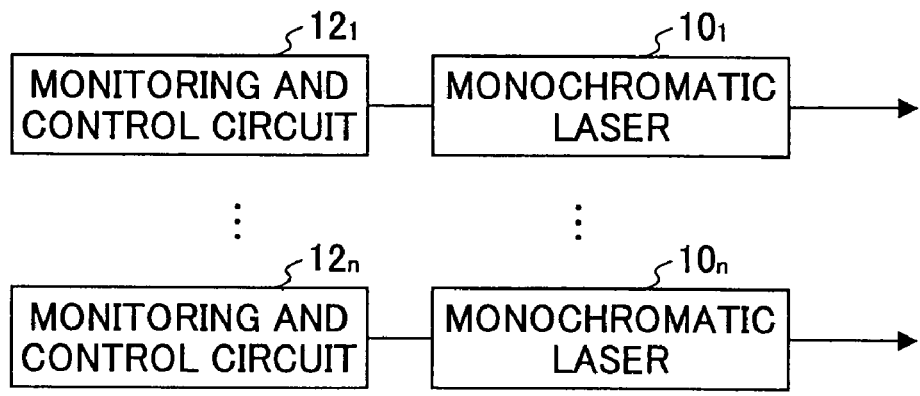
FIG. 1 is a block diagram of an example of a related-art multi-wavelength light source.
Figure 2:
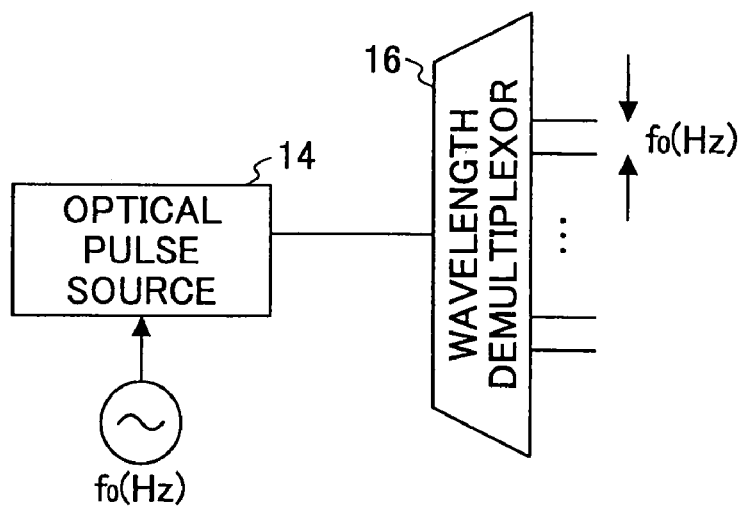
FIG. 2 is a block diagram of another example of a related-art multi-wavelength light source.
Figure 3:
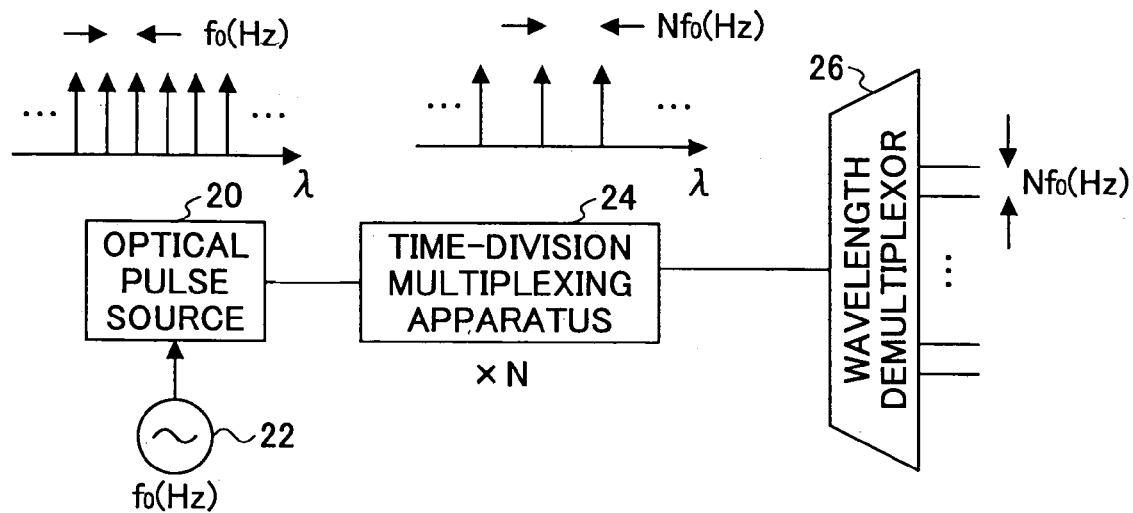
FIG. 3 is a block diagram of a first embodiment of the multi-wavelength light source according to the invention.

FIG. 3 illustrates a block diagram of a first embodiment of the multi-wavelength light source according to the invention. In FIG. 3, the optical pulse source 20 is modulated by a signal with the frequency $f_0$ (Hz) which is received from the synthesizer 22 so as to produce an optical pulse with a repetition frequency of $f_0$ (Hz). Hereupon, in general, $f_0$ (Hz) is around 10 to 40 GHz. Also, as an optical pulse source 20, a semiconductor mode-locking laser, a fiber ring laser, a semiconductor ring laser, and an electroabsorption modulator, etc., may be used. As may be evident from the equation (2), observing the wavelength domain, a frequency spacing of the optical pulse train is $f_0$ (Hz). This pulse train is led into the time-division multiplexing apparatus 24 in which the repetition frequency is multiplied by N to the extent that crosstalk between neighboring pulses is not produced. The frequency component of the optical pulse output from the time-division multiplexing apparatus 24 would be $f_0$ (Hz) multiplied by N. Then, when the repetition frequency is multiplied by N, as evident from the equation (2), the frequency spacing of the longitudinal component is multiplied by N.

When the longitudinal component of this frequency spacing $f_0$ (Hz) multiplied by N is demultiplexed by the wavelength demultiplexer 26 having a multi-peak structure with a transmission center frequency spacing of $f_0$ (Hz) multiplied by N, a multi-wavelength light source with a frequency spacing of $f_0$ (Hz) multiplied by N can be implemented. As a wavelength demultiplexer 26, an Arrayed Waveguide Grating (AWG) filter and an interleaver, etc., may be used.

A requirement for the time-division multiplexing apparatus 24 is to multiply the repetition frequency of the optical pulse train by a fixed multiplier, provided that the polarization state, the intensity, the spacing between neighboring pulses, etc., after said multiplying are kept equal.

Figure 4:
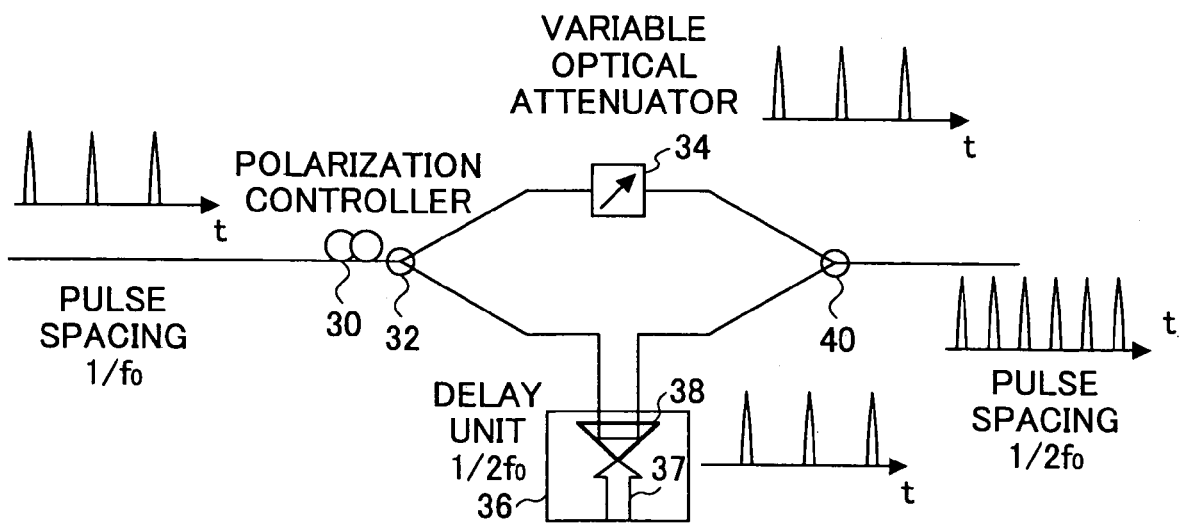
FIG. 4 is a block diagram of an embodiment of a Mach-Zehnder-interferometer-type time-division multiplexing apparatus.

As a time-division multiplexing apparatus which fulfills this requirement, there is a Mach-Zehnder-interferometer-type time-division multiplexing apparatus. FIG. 4 illustrates a block diagram of an embodiment of a Mach-Zehnder-interferometer-type time-division multiplexing apparatus. In FIG. 4, the optical pulse train with a repetition frequency $f_0$ (Hz) passes through the polarization controller 30 so as to branch into two paths at the optical coupler 32. In FIG. 4, a variable optical attenuator 34 and an optical delay unit 36 are respectively arranged along the two different respective paths, but both of them may be arranged along a single path only out of the two paths.

In the variable optical delay unit 36, the time difference between the two paths is adjusted to $1/(2*f_0)$ (sec) so that the repetition frequency of the optical pulse train output from the optical coupler for multiplexing is doubled. The variable optical delay unit 36 with, for example, a delay circuit in which a micrometer 37 and a corner cube 38 are combined, fine-tunes the optical path lengths at the micrometer 37 so as to enable controlling of the delay distance of the optical pulse train.

Furthermore, the pulse intensity is adjusted at the variable optical attenuator 34 so as to make the intensities of the two optical pulse trains which propagate through the different paths equal after multiplexing at the optical coupler 40. In this case, any of the optical components 32 through 40 beyond the polarization controller 30 is composed with polarization-preserving components and the polarization controller at the end of the incidence is adjusted so that the state of polarization of the optical pulse train after multiplexing will be the single-polarization state.

As a matter of course, if the optical components beyond the output of the optical pulse source 20 are composed of polarization-preserving components, there is no need for the polarization controller 30. Furthermore, using the micrometer 37, the delay time can be controlled in an order of magnitude of a femto-second, which in a common light source allowing a few percentage points of deviation for the absolute wavelength, enables controlling with sufficiently high precision.

By this set of operations, the repetition frequency can be made to twice the $f_0$(Hz). Furthermore, by sequentially repeating the same procedure, an optical pulse train with a repetition frequency which is multiplied by 2 to the nth power may be obtained.

Figure 5:
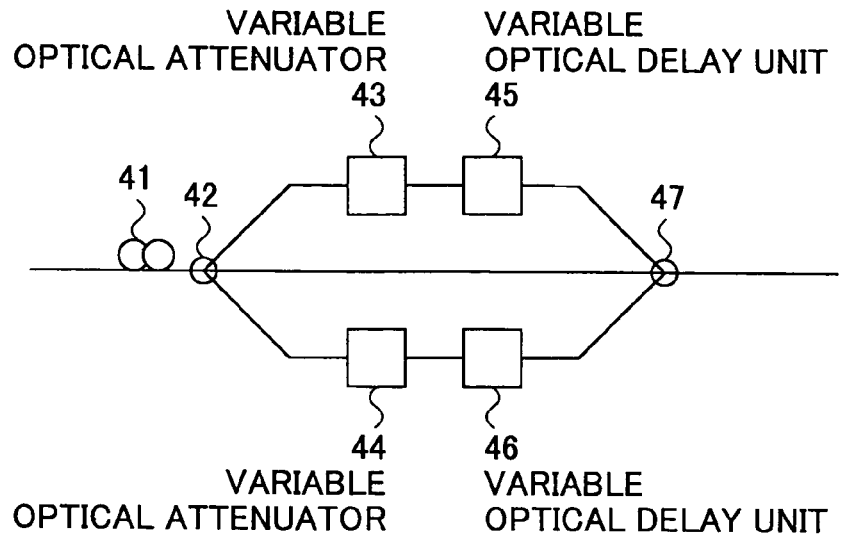
FIG. 5 is a block diagram of a variation of a Mach-Zehnder-interferometer-type time-division multiplexing apparatus.

Moreover, as illustrated in the variation of FIG. 5, an optical pulse train with a repetitive frequency $f_0$ (Hz) passes through the polarization controller 41 and then branches to 3 paths at the optical coupler 42. The variable optical attenuators 43 and 44, and the variable optical delay units 45 and 46 are provided to adjust the time difference among the respective paths to be $\pm 1/(3*(f_0))$ (sec) so as to make the intensities and the polarization states of the three optical pulse trains which propagate through the paths equal after multiplexing by the optical coupler 47. Hereby, multiplexing by the optical coupler 47 the pulse trains which pass through the three paths enables the obtaining of an optical pulse train with a repetition frequency of $3*f_0$ (Hz).

Figure 6:
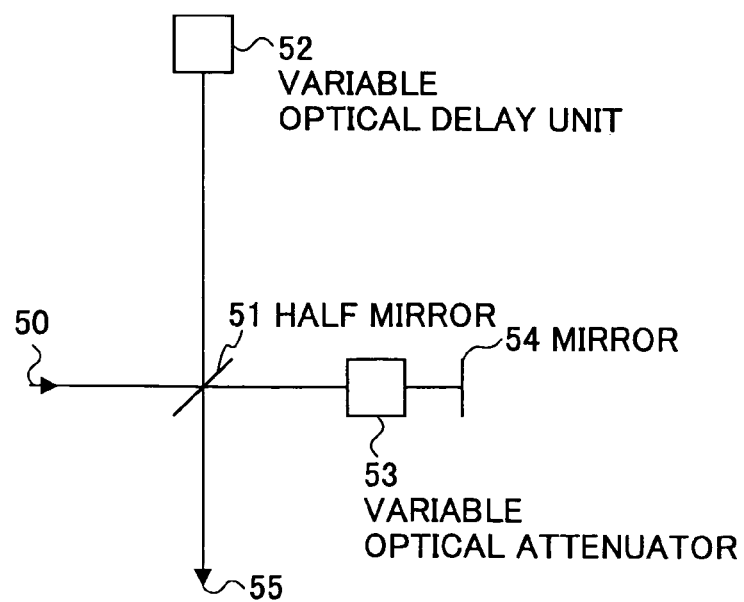
FIG. 6 is a block diagram of an embodiment of a Michelson-interferometer-type time-division multiplexing apparatus.

FIG. 6 illustrates a block diagram of an embodiment of a Michelson-interferometer-type time-division multiplexing apparatus. In FIG. 6, an optical pulse train with a repetition frequency of $f_0$ (Hz) incident upon the input port 50 is branched into two at the half mirror 51. One optical pulse train which is reflected by the half mirror 51 is reflected by the variable optical delay unit 52, passes through the half mirror 51 so as to output from the output port 55.

Furthermore, the other optical pulse train incident upon the input port 50 passes through the half mirror 51 so as to pass through the variable optical attenuator 53, is reflected by the mirror 54 so as to again pass through the variable optical attenuator 53, and is reflected by the half mirror 51 so as to be output at the output port 55.

Hereupon also, while the time difference between the respective paths is adjusted to be $1/(2*(f_0))$ (sec), the intensities of the two optical pulse trains which propagate through the different paths are adjusted at the variable optical attenuator 53 so as to make them equal at the output port 55. Hereby, obtaining an optical pulse train with a repetition frequency of $2*(f_0)$ (Hz) at the output port 55 is enabled.

Figure 7:
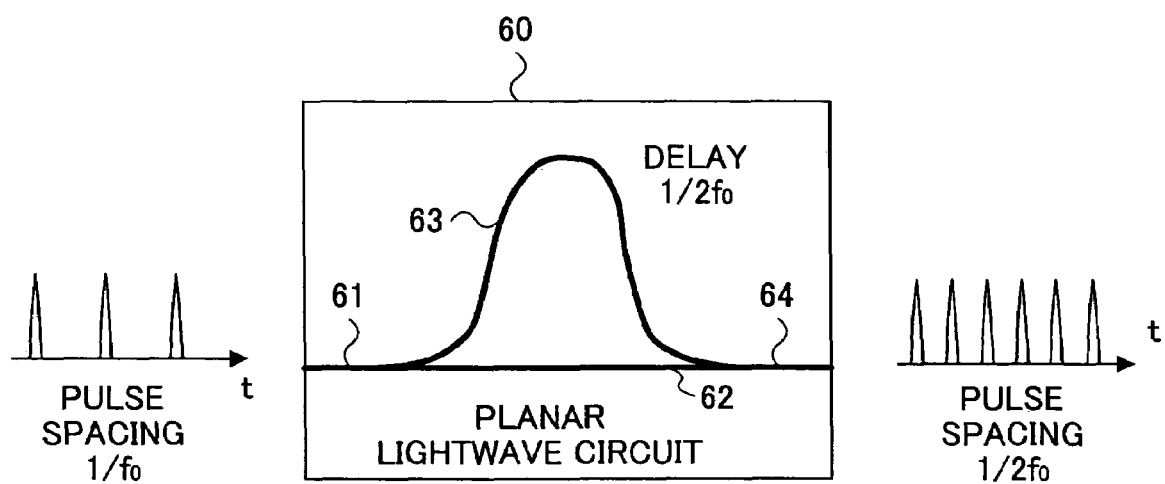
FIG. 7 is a block diagram of an embodiment of a time-division multiplexing apparatus using a planar lightwave circuit.

FIG. 7 illustrates a block diagram of an embodiment of a time-division multiplexing apparatus using a planar lightwave circuit. In FIG. 7, the planar lightwave circuit (PLC) 60 is arranged with an input optical waveguide 61 and optical waveguides 62, 63 and an output optical waveguide 64. The input optical waveguide 61 branches into the optical waveguides 62, 63 and the ends of the respective optical waveguides 62, 63 are coupled into the output optical waveguide 64.

The optical path length of the optical waveguide 63 is set so that the time difference relative to the optical waveguide 62 would be $1/(2*f_0)$ (sec) and also so that the respective optical waveguides 62 and 63 are set to have equal amounts of optical attenuation. Hereby, outputting an optical pulse train with a repetition frequency of $2*f_0$ (Hz) from an output optical waveguide is enabled.

Besides, arranging a time-division multiplexing apparatus 24 using the planar lightwave circuit (PLC) as described above and an AWG which composes the wavelength demultiplexer 26 on a single board of silicon or silica enables the implementation of a more stable multi-wavelength light source.

Incidentally, the number of wavelengths in the multi-wavelength light source which can be implemented with the basic composition of the invention as illustrated in FIG. 3, is determined uniquely by the spectrum bandwidth of the optical pulse train output from a laser as the optical pulse source 20. In other words, the narrower the pulse width, the larger the spectrum bandwidth so that producing a large number of light sources is enabled.

Figure 8:
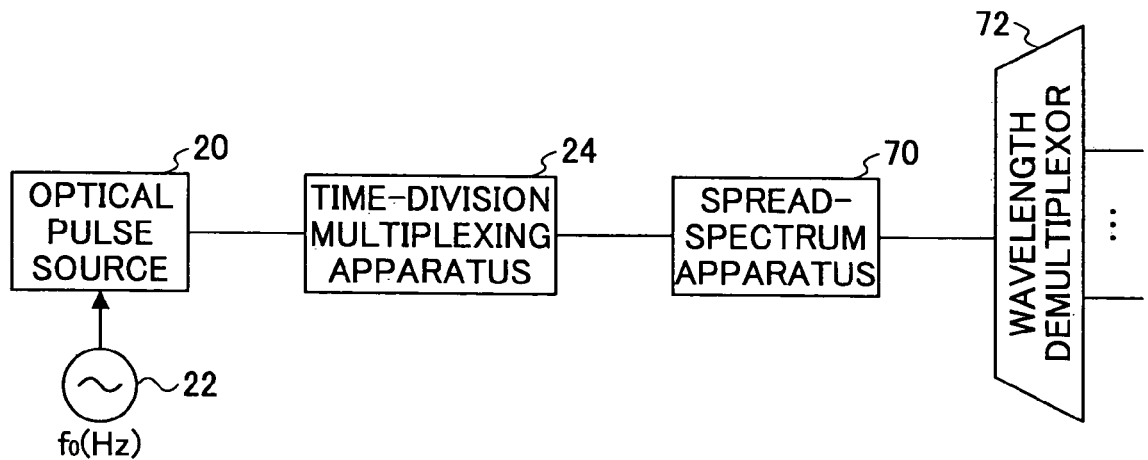
FIG. 8 is a block diagram of a second embodiment of the multi-wavelength light source according to the invention.

As a means for securing a larger number of wavelengths simultaneously, there is a method of using a spectrum-broadening technology. FIG. 8 illustrates a block diagram of a second embodiment of the multi-wavelength light source according to the invention. In FIG. 8, the same reference letters are attached to the parts which are the same as in FIG. 3.

In FIG. 8, the optical pulse source 20 is modulated by a signal with a frequency of $f_0$ (Hz) which is received from the synthesizer 22 so as to produce an optical pulse with a repetition frequency of $f_0$ (Hz). This pulse train is led into the time-division multiplexing apparatus 24 so as to multiply the repetition frequency by N.

The spectrum of the optical pulse train which is made to have a desired frequency spacing by the time-division multiplexing apparatus 24 is broadened at the spectrum-broadening apparatus 70. The spectrum-broadening apparatus 70 which is previously proposed in the Patent Document 2, etc., by the applicant of the present invention comprises a non-linear medium having a third-order non-linear effect in which the spectrum is broadened by the non-linear effect so that the spectral bandwidth of the optical pulse is multiplied. As a non-linear medium, a fiber enhanced with non-linearity such as a highly non-linear fiber, a holey fiber and a photonic crystal fiber, are useful.

The optical pulse output by the spectrum-broadening apparatus 70 with a repetition frequency of $N*f_0$ (Hz) and a spectral bandwidth multiplied by M is demultiplexed in wavelength and output by the wavelength demultiplexer 72 having a multi-peak structure with a transmission center frequency spacing of $N*f_0$ (Hz).

Figure 9:
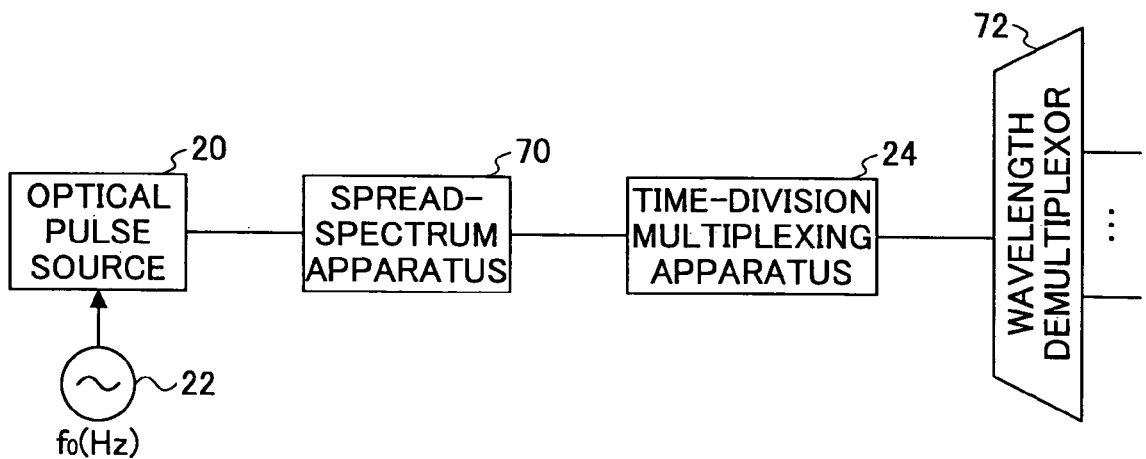
FIG. 9 is a block diagram of a third embodiment of the multi-wavelength light source according to the invention.

FIG. 9 is a block diagram of a third embodiment of the multi-wavelength light source according to the invention. The difference of this embodiment relative to the second embodiment is that the sequence of the time-division multiplexing apparatus 24 and the spectrum-broadening apparatus 70 has been reversed. Even in the case of arranging according to the sequence as illustrated in FIG. 9, a multi-wavelength light source with large and also equal frequency spacings can be implemented in a similar manner.

As described in the above, the multi-wavelength light source according to the invention enables the providing of a multi-wavelength light source with equal frequency spacings, said frequency exceeding the frequency limit for electronic modulation.

Further, the present invention is not limited to these embodiments, but various variations and modifications may be made without departing from the scope of the present invention.

The present application is based on Japanese Priority Patent Application No. 2003-068631 filed Mar. 13, 2003, with the Japanese Patent Office, the entire contents of which are hereby incorporated by reference.

What is claimed is:
1. A method of providing a multi-wavelength light source, comprising:
  modulating an optical pulse source so as to output optical pulses with a designated repetition frequency $f_0$;
  time-division multiplexing the optical pulses output by said optical pulse source by causing the outputted optical pulses to be branched by a half mirror into first and second lights, so that the branched first light is reflected by a variable optical delay unit and then the reflected first light passes through the half mirror to an output port, and so that the branched second light passes through a variable optical attenuator is then reflected by a mirror and then the reflected second light again passes through the variable optical attenuator and thereafter passes through the half mirror to the output port, to thereby multiplex together the first light passing through the half mirror and the second light passing through the half mirror into a multiplexed light which is output through the output port and which includes optical pulses with a repetition frequency of $2*(f_0)$, wherein
  a time difference of a path traveled by the first light and a path travelled by the second light is $1/(2*(f_0))$, and the variable optical attenuator adjusts intensity of the second light so that intensities of optical pulses in the branched first and second lights are equal in the multiplexed light output through the output port; and demultiplexing wavelengths of optical pulses in the multiplexed light output through the output port to thereby output lights as the multi-wavelength light source.

2. An apparatus for providing a multi-wavelength light source, comprising:

an optical pulse source which is modulated so as to output optical pulses with a designated repetition frequency $f_0$;

a time-division multiplexing unit which causes the outputted optical pulses to be branched by a half mirror into first and second lights, so that the branched first light is reflected by a variable optical delay unit and then the reflected first light passes through the half mirror to an output port, and so that the branched second light passes through a variable optical attenuator is then reflected by a mirror and then the reflected second light again passes through the variable optical attenuator and thereafter passes through the half mirror to the output port, to thereby multiplex together the first light passing through the half mirror and the second light passing through the half mirror into a multiplexed light which is output through the output port and which includes optical pulses with a repetition frequency of $2*f_0$, wherein a time difference of a path traveled by the first light and a path travelled by the second light is $1/(2*(f_0))$, and the variable optical attenuator adjusts intensity of the second light so that intensities of optical pulses in the branched first and second lights are equal in the multiplexed light output through the output port; and a wavelength demultiplexing unit which demultiplexes wavelengths of optical pulses in the multiplexed light output through the output port to thereby output lights as the multi-wavelength light source.

3. The apparatus for providing a multi-wavelength light source as claimed in claim 2, wherein said time-division multiplexing unit is a Michelson-interferometer-type time-division multiplexing apparatus.

4. The apparatus for providing a multi-wavelength light source as claimed in claim 2, further comprising a spectrum-broadening unit which broadens spectrum of the optical pulses received at said time-division multiplexing unit, said spreading effected by a non-linear medium having a third-order non-linear effect.

5. An apparatus comprising:

means for modulating an optical pulse source so as to output optical pulses with a designated repetition frequency $f_0$;

means for time-division multiplexing the optical pulses output by said optical pulse source by causing the outputted optical pulses to be branched by a half mirror into first and second lights, so that the branched first light is reflected by a variable optical delay unit and then the reflected first light passes through the half mirror to an output port, and so that the branched second light passes through a variable optical attenuator is then reflected by a mirror and then the reflected second light again passed through the variable optical attenuator and thereafter pass through the half mirror to the output port, to thereby multiplex together the first light passing through the half mirror and the second light passing through the half mirror into a multiplexed light which is output through the output port and which includes optical pulses with a repetition frequency of $2*(f_0)$, wherein a time difference of a path traveled by the first light and a path travelled by the second light is $1/(2*(f_0))$, and the variable optical attenuator adjusts intensity of the second light so that intensities of optical pulses in the branched first and second lights are equal in the multiplexed light output through the output port; and means for demultiplexing wavelengths of optical pulses in the multiplexed light output through the output port to thereby output lights as a multi-wavelength light source.

* * * * *

UNITED STATES PATENT AND TRADEMARK OFFICE
CERTIFICATE OF CORRECTION

PATENT NO. : 7,643,754 B2
APPLICATION NO. : 10/762551
DATED : January 5, 2010
INVENTOR(S) : Fumio Futami et al.

It is certified that error appears in the above-identified patent and that said Letters Patent is hereby corrected as shown below:

Column 8, Line 28, claim 5, change "$2*f_0))$," to --$2*(f_0)$,--.

Signed and Sealed this

Sixth Day of April, 2010

David J. Kappos
*Director of the United States Patent and Trademark Office*